US010525689B2

(12) United States Patent
Paternoster et al.

(10) Patent No.: US 10,525,689 B2
(45) Date of Patent: Jan. 7, 2020

(54) METHOD AND DEVICE FOR THE IMPROVED CONTROL OF THE ENERGY INPUT IN A GENERATIVE LAYER CONSTRUCTION METHOD

(71) Applicant: EOS GmbH Electro Optical Systems, Krailling (DE)

(72) Inventors: Stefan Paternoster, Andechs (DE); Frank Müller, München (DE); Albert Fruth, München (DE)

(73) Assignee: EOS GmbH Electro Optical Systems, Krailling (DE)

( * ) Notice: Subject to any disclaimer, the term of this patent is extended or adjusted under 35 U.S.C. 154(b) by 500 days.

(21) Appl. No.: 15/110,495

(22) PCT Filed: Jan. 29, 2015

(86) PCT No.: PCT/EP2015/051768
§ 371 (c)(1),
(2) Date: Jul. 8, 2016

(87) PCT Pub. No.: WO2015/114035
PCT Pub. Date: Aug. 6, 2015

(65) Prior Publication Data
US 2016/0332379 A1   Nov. 17, 2016

(30) Foreign Application Priority Data
Jan. 31, 2014   (DE) .................. 10 2014 201 818

(51) Int. Cl.
*B29C 35/08* (2006.01)
*B33Y 50/00* (2015.01)
(Continued)

(52) U.S. Cl.
CPC ............ *B33Y 10/00* (2014.12); *B22F 3/1055* (2013.01); *B29C 35/0288* (2013.01);
(Continued)

(58) Field of Classification Search
CPC ............ B22F 3/1055; B22F 2033/1056; B22F 2033/1057; B29C 64/153; B29C 64/393
See application file for complete search history.

(56) References Cited

U.S. PATENT DOCUMENTS 5,530,221 A * 6/1996 Benda .................. B22F 3/1055
                                                          219/121.83
5,908,569 A * 6/1999 Wilkening ............ B29C 64/153
                                                          156/272.8
(Continued)

FOREIGN PATENT DOCUMENTS

DE   102011009624 A1   8/2012
EP       1568472 A1   8/2005
(Continued)

OTHER PUBLICATIONS

PCT International Preliminary Report on Patentability, dated Aug. 11, 2016, 11 pages—English Translation.

*Primary Examiner* — Atul P. Khare
(74) *Attorney, Agent, or Firm* — Seyfarth Shaw LLP

(57) ABSTRACT

The invention relates to a method for constructing a three-dimensional object (3) in layers from a pulverulent construction material by solidifying layers of the pulverulent construction material in a successive manner at each layer point which corresponds to a cross-section of the object, wherein the solidification process is carried out by introducing thermal energy. The method has the following step: solidifying all the layer points which correspond to a cross-section of the object. The introduced thermal energy quantity is adjusted at least in a sub-region of the layer dependent on the duration of the previous solidification step for the previous powder layer or dependent on the current solidification step duration, which is calculated in advance.

12 Claims, 6 Drawing Sheets

(51) Int. Cl.
    *B33Y 10/00*     (2015.01)
    *B22F 3/105*     (2006.01)
    *B29C 64/153*     (2017.01)
    *B29C 64/393*     (2017.01)
    *B29C 35/02*     (2006.01)
    *B33Y 30/00*     (2015.01)
    *B33Y 80/00*     (2015.01)
    *B33Y 50/02*     (2015.01)
    *B29K 105/00*     (2006.01)

(52) U.S. Cl.
    CPC ............ B29C 35/08 (2013.01); B29C 64/153 (2017.08); B29C 64/393 (2017.08); B33Y 30/00 (2014.12); *B22F 2003/1057* (2013.01); *B29K 2105/251* (2013.01); *B33Y 50/02* (2014.12)

(56) References Cited

U.S. PATENT DOCUMENTS

| | | | | |
|---|---|---|---|---|
| 7,452,500 B2* | 11/2008 | Uckelmann | ........ | A61C 13/0004 419/6 |
| 7,569,174 B2* | 8/2009 | Ruatta | ..................... | C23C 24/10 264/497 |
| 9,011,982 B2* | 4/2015 | Muller | .................. | B33Y 10/00 427/493 |
| 9,713,856 B2* | 7/2017 | Fockele | ............... | B22F 3/1055 |
| 9,952,236 B2* | 4/2018 | Satzger | ................ | B22F 3/1055 |
| 2005/0186538 A1 | 8/2005 | Uckelmann | | |
| 2007/0196561 A1* | 8/2007 | Philippi | ............... | B33Y 30/00 427/8 |
| 2009/0206065 A1 | 8/2009 | Kruth et al. | | |
| 2013/0300035 A1* | 11/2013 | Snis | ...................... | B22F 3/1055 264/497 |
| 2013/0343947 A1 | 12/2013 | Satzger et al. | | |
| 2014/0252685 A1* | 9/2014 | Stucker | .................. | B29C 64/20 264/401 |
| 2014/0332507 A1 | 11/2014 | Fockele | | |
| 2015/0064048 A1 | 3/2015 | Bessac et al. | | |
| 2015/0174658 A1* | 6/2015 | Ljungblad | ............. | B33Y 10/00 419/55 |
| 2017/0282455 A1* | 10/2017 | DeFelice | ................ | B33Y 10/00 |

FOREIGN PATENT DOCUMENTS

| | | |
|---|---|---|
| WO | 1995011100 A1 | 4/1995 |
| WO | 2013079581 A1 | 6/2013 |
| WO | 2013127655 A1 | 9/2013 |

* cited by examiner

METHOD AND DEVICE FOR THE IMPROVED CONTROL OF THE ENERGY INPUT IN A GENERATIVE LAYER CONSTRUCTION METHOD

TECHNICAL FIELD OF THE INVENTION

The present invention refers to a method for a layer-wise construction of three-dimensional objects by means of additive manufacturing and to a corresponding device. In particular, the present invention refers to such a method and such a device, by which the precision of the manufactured objects is improved.

BACKGROUND OF THE INVENTION

WO 95/11100 A1 describes a laser sintering method as a special case of a layer-wise additive manufacturing method. In case a powder is used as starting material for the manufacture, which powder is sintered and melted, respectively, by the introduction of heat energy, the building process usually is carried out such that a CAD model of the object to be manufactured is prepared, which CAD model is sectioned into layers, and subsequently the building material is solidified layer-wise corresponding to cross-sections of the CAD model.

For each powder layer the building process proceeds as follows:

After the application of a building material layer in powder form onto an already solidified layer, at first the newly applied powder layer is pre-heated by means of a radiant heating up to a working temperature below the temperature at which solidification is carried out. Then, a radiation (such as a laser beam) is directed onto the pre-heated layer for selectively solidifying the building material. After all layers of the object have been manufactured, the object is allowed to cool down and is removed from the unsolidified powder that surrounds the object.

As is apparent from the just outlined manufacturing process, before parts of a powder layer that correspond to a cross-section of the object to be manufactured are solidified by sintering or melting by means of a laser beam, the powder layer at first is pre-heated. Due to the pre-heating of the powder layer the laser beam needs to supply to the powder only a small surplus energy in order to let the solidification process happen. This allows for a quicker selective solidification of a layer (selective exposure of an object cross-section that corresponds to this layer) and moreover allows for a better control of the energy introduced into the powder.

WO 95/11100 A1 deals with the manufacturing of metal parts from a metal powder and describes the problem that with a constant laser power parts having non-uniform material properties are produced. The reason for this is that there are regions of the powder bed that melt completely and regions, in which there does not occur a complete melting. Temperature inhomogeneities within a powder layer on which the laser beam for solidification is incident, are identified by WO 95/11100 A1 as cause of this problem.

WO 95/11100 A1 mentions that the fact, whether below the point of incidence of the laser beam in the current top-most layer, more precisely in the layer below this top-most layer, a solidification process already has occurred or not, plays a role. If below the point of incidence of the laser, thus in the layer below, there is still unsolidified powder material, heat dissipation by this unsolidified material is not very good and more energy is available for the melting process at the actual point of incidence of the laser in the current layer. Furthermore, it is explained that also the fact, how many already solidified regions in the current layer abut the current point of incidence, does play a role. For the case that many solidified regions are abutting the current point of incidence, heat energy will be dissipated better by the solidified regions than by unsolidified powder. The reason for this is that the solidified regions in WO 95/11100 A1 consist of a metal with good heat conductivity. Therefore, according to WO 95/11100 A1 more laser energy has to be supplied for a good solidification result (a melting of the powder as complete as possible).

In order to solve the just described problem, WO 95/11100 A1 suggests adapting the laser energy to the temperature of the powder layer that is detected by a temperature sensor close to the point of incidence of the laser for each point of incidence of the laser.

Also WO 2013/079581 A1, which deals with the manufacturing of molds from metal or ceramics powders, recognizes the necessity of taking into account temperature inhomogeneities within a layer to be solidified when energy is inputted by means of a laser. However, WO 2013/079581 A1 wants to avoid the relatively large effort in measuring technology as well as the effort for the real time computing for a temperature detection close to the respective points of incidence of the laser beam. Rather, WO 2013/079581 A1 suggests calculating by means of a computer the heat energy to be inputted at a position already before the execution of the entire building process:

As the CAD data of the object to be manufactured are at hand anyhow, with knowledge of the thermal parameters of the building material that is used the heat dissipation capability can be calculated in advance for each point of incidence of the beam in each layer and the energy input per unit time can be varied accordingly at the respective irradiation position. Here, in WO 2013/079581 A1 the different heat dissipation capability of the surrounding of a point of incidence of the beam is taken into consideration by defining a local surrounding area of a defined size around each point of incidence of the beam and calculating the heat dissipation capability for each voxel in this local surrounding area. As is already apparent from the description of the method, the computing effort for a corresponding determination of the laser parameters for each irradiation position is not small.

SUMMARY OF THE INVENTION

Therefore, it is an object of the present invention to provide a method for a layer-wise additive manufacturing of three-dimensional objects as well as a corresponding device, which achieve a high manufacturing accuracy with limited effort.

The object is achieved by a method according to claim 1 and a device according to claim 12. Further developments of the invention are given in the dependent claims.

The invention is based on the idea that a layer-wise manufacturing is a dynamical process. Whereas in the prior art an improved accuracy of details of the objects to be manufactured is achieved by taking into consideration the heat dissipation capability resulting from the geometry of the object to be manufactured in the powder bed, the present invention takes into consideration the time dependence of the cooling-down of a solidified region.

The inventors of the present application have recognized that the properties of an object to be manufactured such as the elongation at break, the dimension or the surface quality depend on the duration (total exposure time) that is needed for the exposure of regions to be solidified in a powder layer.

While for the construction of only a single object the total exposure time is identical to the time needed for the solidification of the object cross-section in the powder layer, for a parallel manufacturing of several objects the total exposure time is the sum of the durations of the exposures of the cross-sections of the individual objects. Surprisingly, the properties of a particular object depend on the fact, how many further objects are manufactured in parallel to this object. The cause for this is the following:

For a long total exposure time of the regions to be exposed (solidified) within a layer, these regions do have more time for giving off heat by heat radiation, heat conduction or convection. Therefore, the layer cools down more and there is not so much energy available in total for a melting or sintering of the following layer. As a result, the mechanical properties such as the elongation at break, are worse due to a worse adhesion of the following layer. On the other hand, for a short total exposure time of a layer, such layer does not cool down so much and the powder in the following layer can melt more completely resulting in better mechanical properties.

Not only the mechanical properties are influenced by the total exposure time of the layers. Also, e.g. the surface quality and further quantities are influenced thereby. For example, also the dimensions of an object cross-section are influenced by the exposure time for a layer, because for a longer exposure time (and a stronger cooling-down) of a layer less unsolidified power in the overlying layer adheres to the edge of the object cross-section than for a shorter total exposure time of the layer.

Furthermore, also the total exposure time of the current layer has an influence on the properties of the object.

The method according to the invention increases or lowers (thus reduces) the heat inputted per unit area for a solidification of the radiation in dependence of the total exposure time of the region to be solidified in the layer lying below the layer to be currently exposed or in dependence of the total exposure time of the region to be solidified in the layer currently to be exposed. Thereby, dynamical processes during the manufacture can be taken into consideration, which is not the case in the prior art. As a result, parts having improved mechanical properties and an improved accuracy of details may be obtained, wherein there is no need for resorting to complicated calculations or measuring methods. In the following, for making clear that according to the invention it is the duration of the exposure of the whole region that is to be solidified in a layer that matters, in the following the "region to be solidified" is mentioned and not the "object cross-section". Thus, also the parallel manufacturing of several objects in the container, in which the building process takes place, is comprised.

In the following, the invention is described by means of the drawings, of which:

DETAILED DESCRIPTION OF THE EMBODIMENTS

Figure 1:
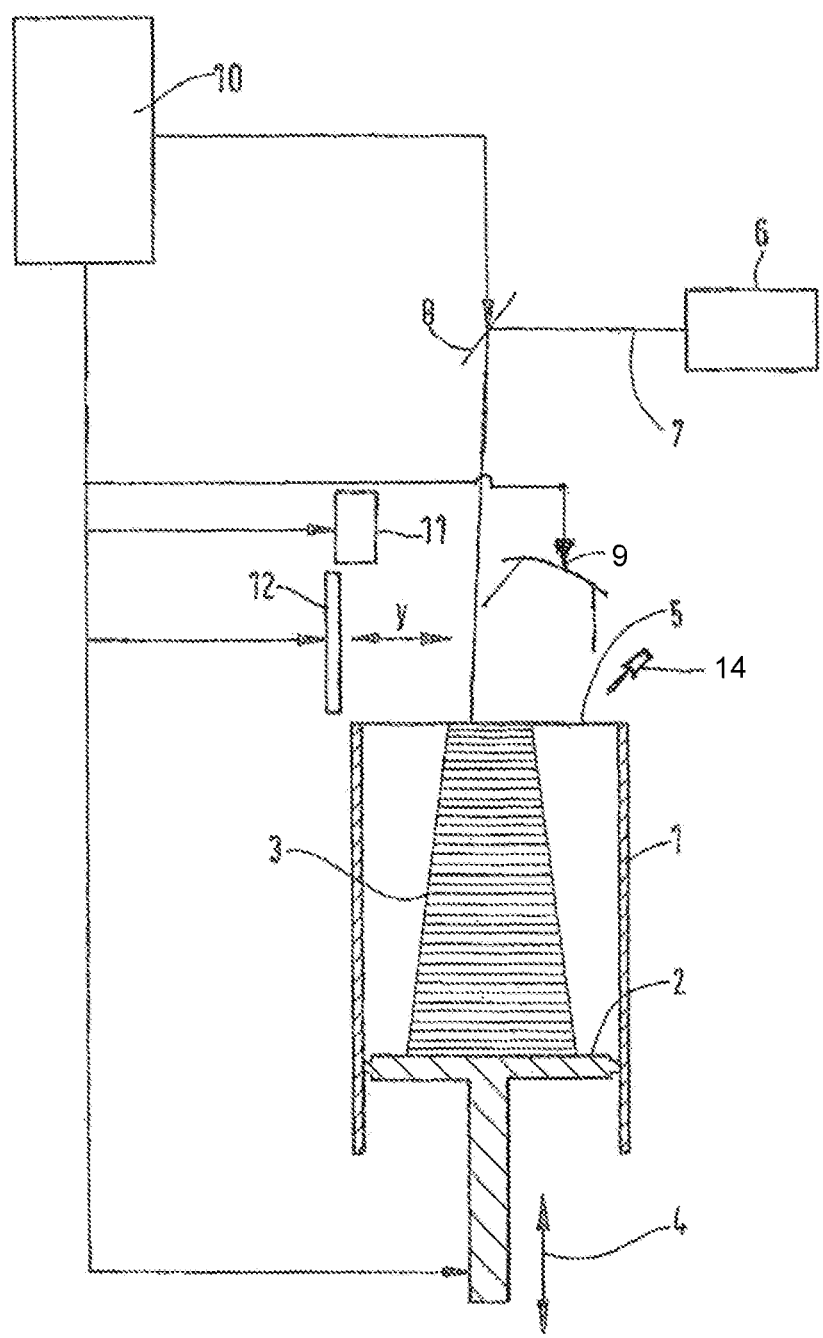
FIG. 1 shows an example of a device for a layer-wise manufacturing of three-dimensional objects from a building material in powder form according to the invention.

At first, the construction of a device according to the invention for manufacturing three-dimensional objects by means of an additive layer-wise manufacturing method is described using the example of a laser sintering device by referring to FIG. 1.

As shown in FIG. 1, the object 3 to be manufactured is manufactured layer-wise on a building support 2. The building support 2 forms the bottom of a container open to the top, in which container the building process takes place and a frame 1 forms the sidewalls thereof. The building support 2 is connected to a lifting mechanism 4 that is able to move the building support in a vertical direction. With its upper end the frame 1 encloses a construction field 5, in which the solidification takes place. A recoater 11 for applying a layer of a building material in powder form in the construction field is arranged above the construction field 5. Here, all powders that may be solidified by introduction of heat can be used as building materials in powder form such as polymer powders, metal powders, ceramics powders or even also composite powders composed of different materials. Furthermore, also fillers and/or additives may be added to the powders.

In addition, FIG. 1 schematically shows an application device 12 that can be moved in a horizontal direction and serves for smoothing an applied powder layer. Furthermore, an irradiation device in the configuration of a laser 6 is provided, which laser 6 generates a laser beam 7 that can be directed to arbitrary points in the construction field 5 by means of a deflection device 8. By the action of the laser beam 7 onto the building material in powder form in the construction field the building material in powder form can be heated selectively, so that as a result it becomes solidified at those positions that correspond to a cross-section of the object 3 to be manufactured.

Furthermore, the device according to the invention includes a heating device 9 above the construction field 5, which preheats a newly applied powder layer up to a working temperature below a temperature at which the solidification of the powder material occurs. Preferably, the heating device (9) is a radiative heating (e.g. one or more radiant heaters) which is able to introduce heat energy into the newly applied powder layer in a large area by emitting electromagnetic radiation. Reference sign 10 designates a control device that is connected to the laser 6, the deflection device 8, the recoater 11, the application device 12 and the lifting mechanism 4 and that controls the building process. Not shown in FIG. 1 is a case that surrounds the frame 1, the lifting mechanism 4, the laser 6, the deflection device 8, the recoater 11 and the application device 12. Furthermore, though in FIG. 1 only one object 3 is shown, nevertheless several objects 3 may be manufactured side by side simultaneously.

In the following, the course of an inventive process for a layer-wise additive construction of a three-dimensional object is described:

At first, the building support 2 is moved by means of the lifting mechanism 4 to a position, at which the top side of the building support 2 or of a building platform arranged on it, lies just under the upper edge of the frame 1. Then, the building material in powder form applied by the recoater 11 is homogeneously spread on the building support 2 or the building platform by means of the application device 12. Here, the vertical distance to the upper edge of the frame 1 that was set at the beginning defines the thickness of the applied layer. Then, a waiting time is introduced. Within such waiting time the applied powder layer is pre-heated by means of the heating device 9 up to a working temperature below a temperature, at which the building material is solidified by the action of the laser beam. Preferably, also the heating device 9 is connected to the control device 10. Preferably, the temperature of the pre-heated building material layer is controlled by a temperature measuring device 14. The temperature measuring device 14 may be a pyrometer, which measures the surface temperature of the applied layer in a region of the construction field 5. As soon as the desired powder layer temperature has been reached, the powder layer is solidified by inputting heat energy by means of the laser beam in the region corresponding to the cross-section of the object. Then, the building support 2 is lowered again by an amount corresponding to a layer thickness of the building material, building material is applied again, pre-heated, selectively solidified, etc. The last-mentioned steps are repeated until the manufacturing process of the object is completed. Depending on the powder type, it may be advantageous to apply a few layers of unsolidified building material before applying the first layer that is solidified in part and/or after the last layer that is solidified in part.

The amount of heat energy introduced by means of the laser radiation into the building material in powder form, which heat energy in the end leads to a solidification of the powder material, determines the achieved mechanical properties and the accuracy of details of the object obtained. As it already has been described for the prior art mentioned in the beginning, the amount of heat introduced per unit area may be varied across the powder layer in order to take into consideration temperature inhomogeneities within the powder layer. However, according to the present invention in addition the amount of heat energy to be introduced per unit area that has been determined for each point of a region to be solidified in a powder layer, is additionally changed compared to the heat energy introduced per unit area in other layers. Preferably, the respective amount of heat to be introduced at the points of a region to be solidified in the layer is multiplied by a pre-factor that depends on the total exposure time for the current region to be solidified or on the total exposure time for the region to be solidified in the underlying layer. This pre-factor preferably is the same for all points of the current region to be solidified, though this need not necessarily be so:

For example, it may happen that several parts are manufactured simultaneously, wherein some of these objects, however, are only dummy objects (test objects), in which the mechanical properties do not matter. In such a case the heat energy introduced per unit area need not be changed in accordance with the invention within the whole region to be solidified within a layer. The approach according to the invention can be limited to a partial region of the region to be solidified in a layer, which partial region does not include the dummy objects. Moreover, there may exist cases, in which an approach according to the invention is not necessary, e.g. in the contour region of an object. Also in such a case the total exposure time of the previous layer or the current layer need not to be taken into consideration at all positions of the layer to be solidified and the contour region is exempted therefrom.

Moreover, under the aspect of good mechanical properties it may be sufficient to apply the method according to the invention only to those positions of an object, at which good mechanical properties are necessary. The method according to the invention thus is applied in particular in a partial region of a region to be solidified in a layer, which partial region lies above an already solidified region in the underlying layer, in other words is overlying an already solidified region in the underlying layer.

The duration for the solidification in a layer is known for a given laser sintering device as the movement speed of the laser is known. In addition, from the CAD data of the object(s) to be manufactured it is known which positions within a layer shall be solidified. Therefore, the necessary length of time for a region to be solidified within the current layer can be calculated in advance. The length of time of the solidification process for a region in the layer underlying the layer to be currently exposed can be determined by a simple time measurement.

A manufacturing of an object by means of additive manufacturing according to the invention thus may look like as follows: The duration of the solidification of the object cross-section(s) in a layer (total exposure time) is measured and then in the following layer a pre-factor for the heat energy input per unit area is chosen in dependence of the measured duration. Alternatively or in addition the total exposure time for the object cross-section(s) in the current layer, which total exposure time has been calculated based on the known laser deflection velocity and the known CAD data, can be considered for choosing the pre-factor.

The approach according to the invention may be succinctly described by means of the following equation, in which $E_{corrected}$ is the heat energy amount per unit area actually introduced at a position, $E_{standard}$ is the heat energy amount per unit area without consideration of a layer exposure time and K is a pre-factor that depends on the total exposure time of a region to be solidified in the previous and/or the current layer:

$$E_{corrected} = K \cdot E_{standard} \quad (1)$$

The determination of the pre-factor can for example be made empirically by pre-tests in the same additive manufacturing device, in which the three-dimensional objects shall be manufactured. In doing so, before the actual manufacturing of the object test objects are manufactured from the same building material and are measured. Preferably, the pre-factor K has the same value for all positions to be exposed in the current layer, meaning is constant over the layer. In case the method according to the invention is used only in a partial region of the region to be solidified in a layer, preferably the pre-factor K at least at positions of this partial region has the same value.

Figure 2:
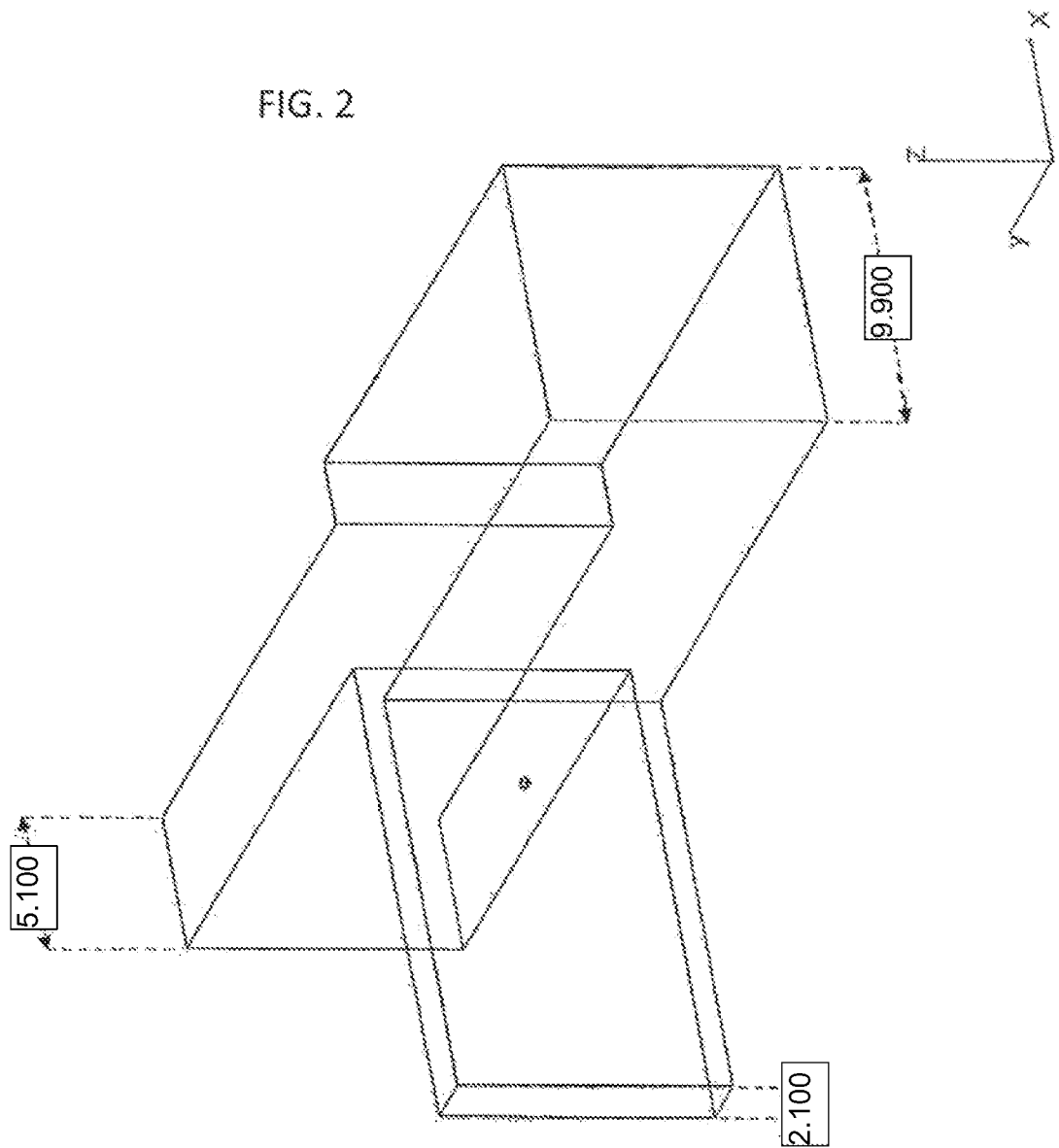
FIG. 2 shows a test part that was manufactured in the context of an exemplary pre-test in order to find the change of the energy input as a function of the layer exposure time.

In the following an exemplary method for an empirical determination of a pre-factor is described:

At first, in the additive layer-wise manufacturing device (such as the device of FIG. 1) a test object shown in FIG. 2 is manufactured several times in succession, wherein the individual manufacturing processes differ in the exposure times (solidification times) necessary for a region to be solidified (this region corresponds to the cross-section of the test object). As the position and shape of an object cross-section does not change in a z direction for the test part of FIG. 2, for each manufacturing process the exposure time (solidification time) is the same for all cross-sections of the test object.

Afterwards, dimensions of the test objects are measured at several positions of each test object (in this example three positions). Here, the measurements should be made at the same positions for all test objects. For example, in FIG. 2 it is the dimension (thickness) of three object portions having the standard dimensions 2.1 mm, 5.1 mm and 9.9 mm. From these three dimensions for each test object a medium dimension can be calculated. In the following table such a medium dimension (medium thickness) is represented as a function of the exposure time for each object cross-section:

| layer exposure time [s] | medium thickness [mm] |
| --- | --- |
| 7.2 | 5.736 |
| 15.4 | 5.714 |
| 17.8 | 5.707 |
| 28.5 | 5.688 |
| 50.0 | 5.668 |

When manufacturing the test objects, the total exposure time for each object cross-section can be set either by introducing a waiting time after the completion of the solidification process for each test object cross-section or by inserting one or more waiting periods during the solidification process of each test object cross-section, in which waiting periods no solidification is effected. An object cross-section of the test object of FIG. 2 thus may be solidified within 7.2 s (the minimum value in the table) and the longer durations in the table result from inserted waiting times.

Figure 3:
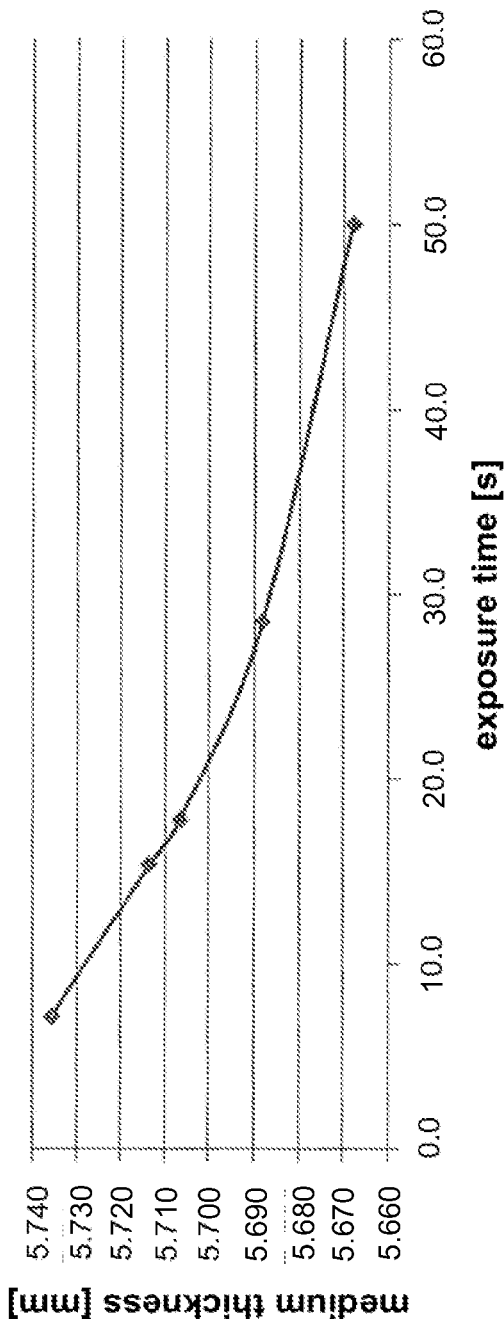
FIG. 3 shows a graph that represents the dependency of the medium thickness detected at the test part as a function of the exposure time for a layer.

FIG. 3 shows the obtained dimensions for the test part as a function of the exposure time for each object cross-section. As expected, the measured dimension (medium thickness) decreases with increasing exposure time, because a solidified object cross-section has more time for cooling down by radiation emission or convection. As a result, less powder adheres to the edge of the object cross-section solidified in the overlying layer, so that the medium thickness determined at the test object is reduced compared to a test object that has been solidified with a shorter exposure time for each cross-section.

Figure 4:
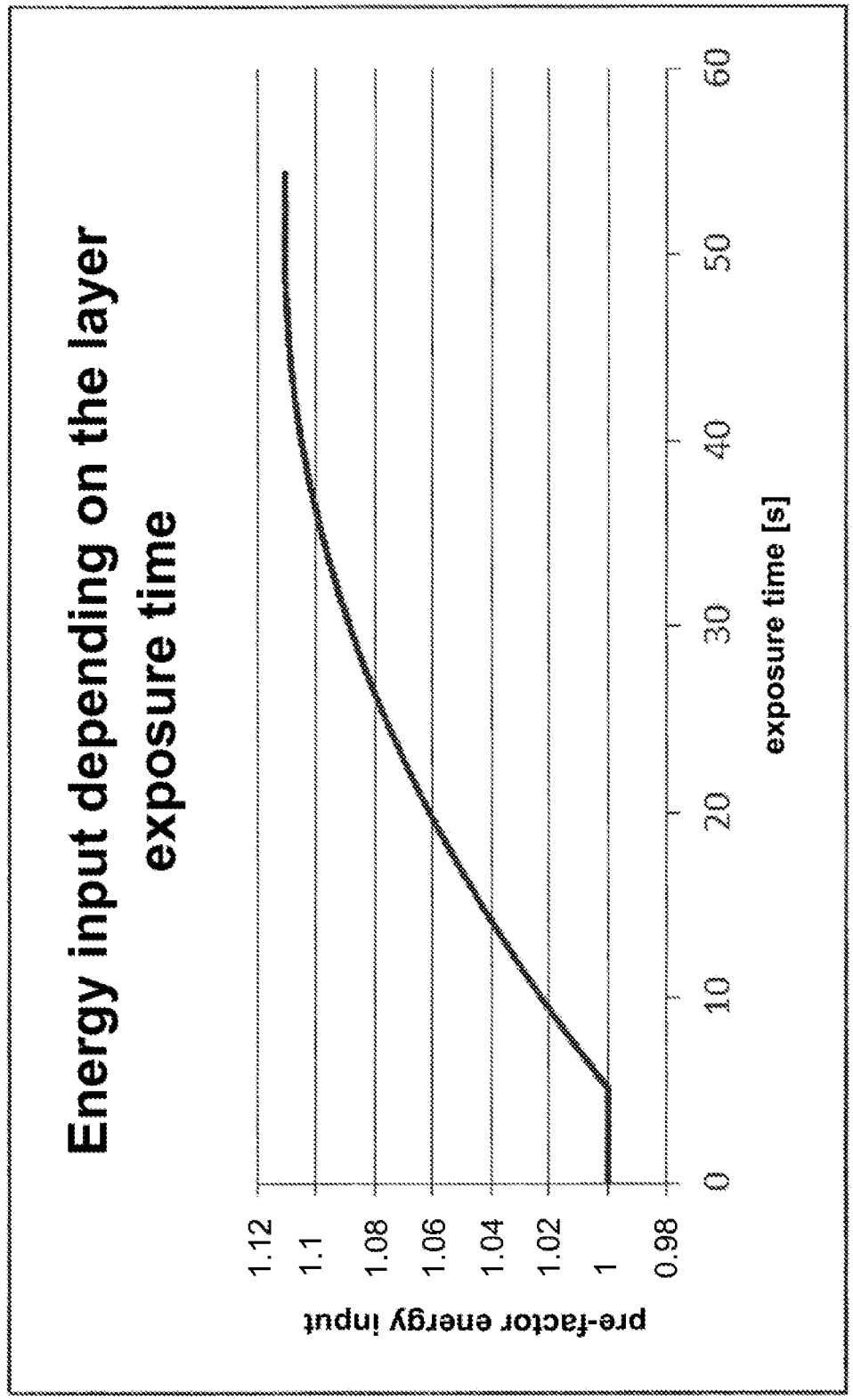
FIG. 4 shows a pre-factor for the energy input determined by measuring the test part as a function of the exposure time for the solidification of the test part.

From FIG. 3 it can be determined, how much the heat energy amount to be inputted per unit area in the object cross-section has to be increased for longer exposure times. Based on FIG. 3 thus the necessary percentage increase of the heat energy amount to be inputted per unit area can be determined. The corresponding result is shown in FIG. 4, wherein FIG. 4 shows the pre-factor K in the above equation (1). In FIG. 4 it is remarkable that K has a value larger than 1 only for exposure times larger than 5 s. This is related to the fact that in the additive layer-wise manufacturing device used in this embodiment, an EOS P395 having default settings, there exists a minimum layer exposure time of 5 s.

Figure 5:
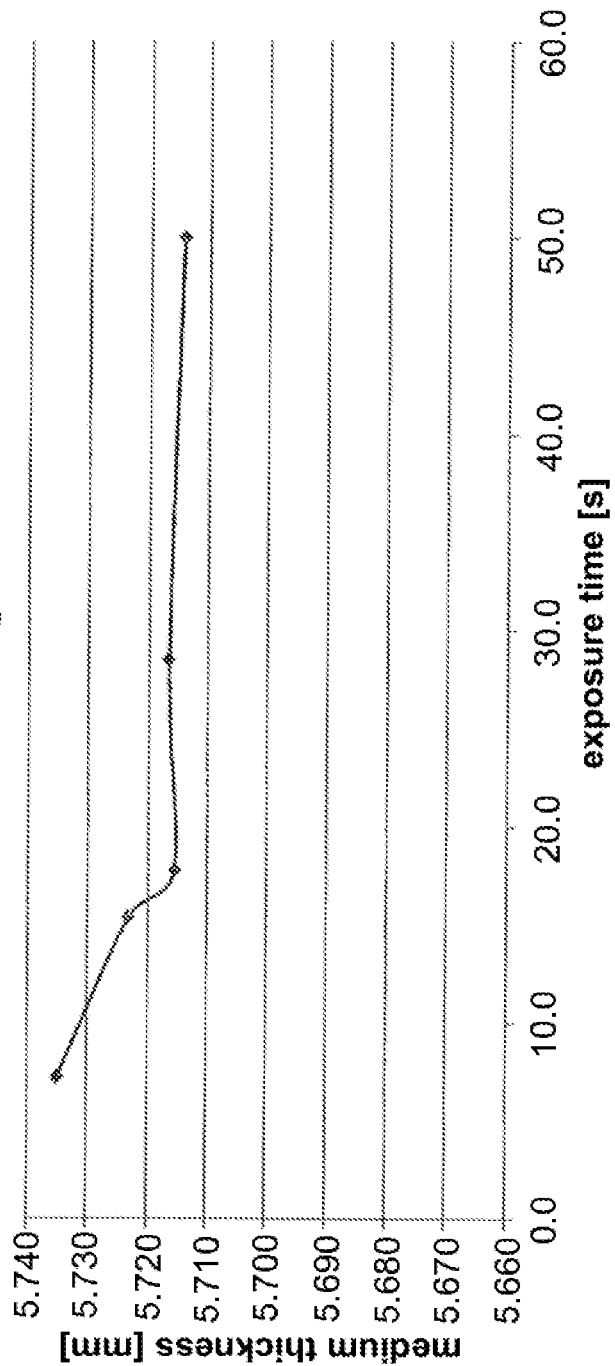
FIG. 5 shows a graph that shows the medium thickness determined at a test part for a case, in which the energy input had been adapted to the exposure time

The values for the pre-factor K can be determined by a limited number of tests, in which the dependency of the pre-factor K on the layer exposure time is determined. FIG. 5 shows dimensions of test parts that were manufactured with differing exposure times of their object cross-sections and in which the heat energy input per unit area was corrected with the pre-factors shown in FIG. 4 depending on the layer exposure time. It can be seen that a considerably more uniform thickness can be obtained that does not depend on the exposure time.

A representative dimension ("medium thickness") was determined at the test parts in this embodiment and the pre-factor, by which the heat energy input per unit area has to be multiplied was determined on the basis of this representative dimension. As already mentioned in the introductory part of the description, the heat amount supplied in total to the powder not only influences the dimensions of a manufactured object but also has an influence on other properties. Therefore, alternatively or in addition to the determination of a characteristic dimension one could determine at the just-described manufactured test parts a characteristic mechanical value such as the elongation at break, a parameter characterizing the surface quality or other properties and use the same as basis for the determination of the pre-factor.

After having determined in the illustrated empirical way a relationship between the pre-factor K and the exposure time for an object cross-section of a test part, for the manufacturing of three-dimensional objects one can proceed as follows:

The length of time that was necessary for the exposure of the whole region to be solidified in a layer is measured. When solidifying the following layer, the heat energy input per unit area is corrected by the pre-factor K, which pre-factor is selected depending on the exposure duration for the previous layer. For an exposure time of the object cross-section in the previous layer of for example 20 s, based on FIG. 4 a pre-factor having the value 1.06 would be chosen. Alternatively or in addition also the exposure duration determined in advance for the total region to be solidified in the current layer may be taken into account for the determination of the pre-factor K.

Of course one could try determining based on theoretical considerations how the heat energy amount to be introduced per unit area has to be corrected in dependence of the exposure duration of the region to be solidified in the current and/or the previous layer. However, the cooling down behavior within a region to be solidified depends on the building material in powder form and furthermore is co-determined by the type and arrangement of the heating device 9. Therefore, it is most appropriate to determine the dependency by means of the described pre-tests.

Which kind of parts are to be used for the pre-test depends on which properties are most important for the object that is actually to be produced. In any case, for a meaningful variation of the exposure duration it will be helpful, if the cross-section of the test object does not change in the z direction (built-up direction).

The heat energy amount introduced per unit area into the building material can be varied by a variation of the light intensity of the laser. Alternatively or in addition, also the duration of the action of the laser on a position to be solidified of the powder layer may be changed by changing the velocity with which the laser sweeps over the construction field 5. The faster the laser beam moves over the construction field 5, the less heat energy per time unit is introduced into the building material. In order to increase the heat energy amount introduced per unit area one could thus also lower the velocity, with which the laser sweeps over the construction field. It should be noted that though by a change of the laser deflection velocity, the total exposure time of the current layer changes, an unlimited increase of the layer exposure times will not result due to the correction of the heat energy input per unit area. Rather, the total exposure time will converge to a maximum value.

Furthermore, the heat energy amount introduced per unit area can also be varied by varying the track distance with which the laser sweeps over a region to be exposed (when performing a so-called "hatching"). In addition, for a pulsed operation the light intensity emitted by the laser for a pulsed operation may also be varied by changing the frequency and/or the duty ratio.

In case the laser sintering device shown in FIG. 1 is used, the manufacturing process is controlled via the control device 10 that controls the light intensity of the laser and/or its deflection velocity and/or the track distance.

In a modification of the method according to the invention, alternatively or in addition to the heat energy amount introduced per unit area the "beam offset" is adapted based on the exposure time for a region to be solidified. The beam offset designates an amount by which the laser beam is shifted towards the inside at the contour of the object in order to take into consideration a.o. that due to heat conduction the powder immediately outside of the region to be solidified is solidified too, whereby the object dimensions do change. If the exposure duration for the previous partially solidified layer was large and thus the solidified region was able to cool down over an extended period of time, less power tends to sinter to the outer contour of the region to be currently solidified. Accordingly, a smaller beam offset can be set for the region that is currently to be solidified. Thus, also the beam offset may be adjusted depending on the exposure duration for the previous and/or the current layer.

In a further modification of the present invention not only the exposure time for a region to be solidified in the current layer or in the layer underlying the same is taken into consideration for the determination of a pre-factor for correcting the heat energy amount to be introduced per unit area or the beam offset in the current layer. Rather, the exposure times of the regions to be solidified in further layers below the current layer are taken into consideration.

Even though always a solidification of the building material by means of a laser beam was mentioned above, the present invention is not limited to this way of introducing heat energy. The invention can be used in all additive manufacturing devices, in which a building material in powder form is solidified layer-wise by inputting heat energy. Here, the inputted heat energy can also be introduced linearly or areally (e.g. by a mask exposure). Laser radiation need not necessarily be used. In particular, also the use of electron radiation may be considered. Furthermore, the present invention is applicable in devices, in which the building material is completely melted as well as in devices, in which a sintering process occurs, in which the powder particles are only melted at the surface.

The invention can be advantageously used in particular in methods, in which three-dimensional objects are manufactured from a plastic powder or a building material that contains a plastic powder and in devices that are suitable for carrying out a method using a building material that contains plastic powder or consists of this powder, respectively. As examples for possible plastic powders are mentioned: laser-sinterable polymers like polyarylether ketones, polyarylether sulfones, polyamides, polyesters, polyethers, polyolefines, polystyrenes, polyphenylene sulfides, polyvinylidene flourides, polyphenylene oxides, polyimides and copolymers and blends thereof that comprise at least one of the afore-mentioned polymers, wherein the selection is however not limited to the above-mentioned polymers and copolymers. Particularly suitable polyarylether ketones may be selected from the group consisting of polyether ether ketone (PEEK), polyether ketone ketone (PEKK), polyether ketone (PEK), polyether ether ketone ketone (PEEKK) and polyether ketone ether ketone ketone (PEKEKK) and polyether ether ether ketone (PEEEK) as well as copolymers thereof, in particular with polyaryl ether sulfones as well as their blends comprising at least one of the afore-mentioned polymers. Particularly suitable polyamide polymers or copolymers and their blends can be selected from the group consisting of polyamide 6/6T, polyamide elastomers like polyether block amides such as PEBAX™-based materials, polyamide 6, polyamide 66, polyamide 11, polyamide 12, polyamide 612, polyamide 610, polyamide 1010, polyamide 1212, polyamide PA6T/66, PA4T/46 and copolymers comprising at least one of the afore-mentioned polymers. Suitable polyester polymers or copolymers can be selected from the group consisting of polyalkyl terephthalates (e.g. PET, PBT) and their copolymers. Suitable polyolefine polymers or copolymers can be selected from the group consisting of polyethylene and polypropylene. Suitable polystyrene polymers or copolymers can be selected from the group consisting of syndiotactic and isotactic polystyrenes. Furthermore, polymer-composite powders may be used that contain fillers and/or additives besides the respective polymer, copolymer or blend. Such fillers include for example fibers such as carbon or glass fibers and carbon nanotubes, fillers with a small aspect ratio such as glass beads or aluminum grit, mineral fillers such as titanium dioxide. Additives include a.o. processing additives such as free flowing agents of the Aerosil series (e.g. Aerosil 200), functional additives such as heat stabilizers, oxidation stabilizers, color pigments (e.g. graphite and carbon black) and flame retardants (e.g. organophosphates, polybrominated hydrocarbons).

Apart from the described differing cooling-down of solidified regions also a cluster of parts located close to one another may lead to a temperature inhomogeneity, in particular to a local over-temperature, as in such a case much energy is introduced into the powder layer within a small space. A similar effect is possible for an object that comprises a large massive portion.

Figure 6:
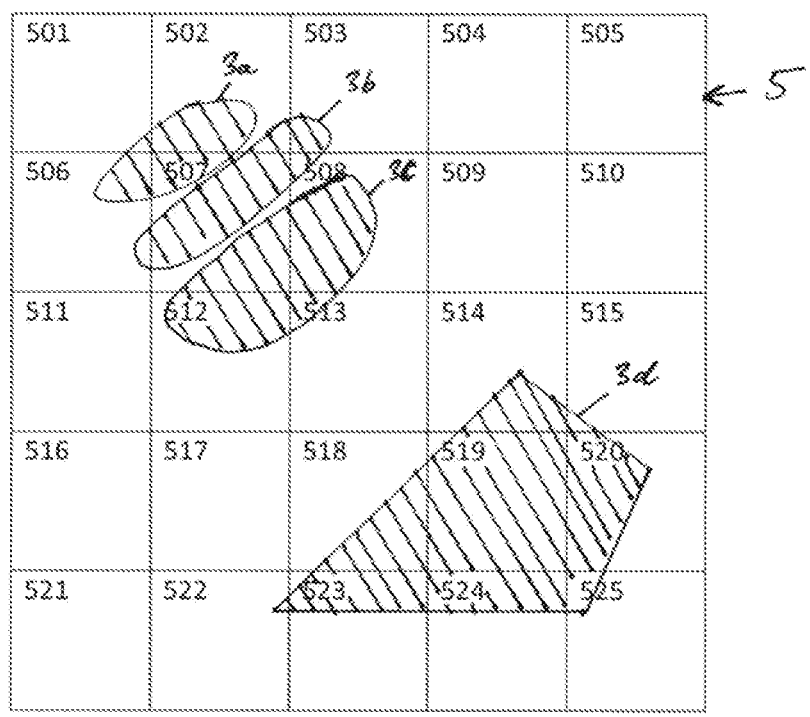
FIG. 6 shows a top view onto the construction field for illustrating an optional procedure for avoiding local overheatings.

The described local over-temperature may lead to a damage to the building material. In order to avoid this, the inventors suggest the following optional approach:

FIG. 6 shows in a schematical way the construction field 5 when viewed from above. In the thus recognizable topmost powder layer object cross-sections to be solidified in this layer are shown with reference signs 3a to 3d. On the one hand in the cluster of object cross-sections 3a to 3c, on the other hand within the object cross-section 3d having a large area a local over-temperature might occur.

The inventors suggest dividing the construction field 5 into several, preferably identical, partial fields. Merely by way of example, FIG. 6 shows twenty five partial fields 501 to 525. For each partial field by means of the CAD data of the object to be manufactured it is determined already before the exposure of the layer to which extent an exposure shall be carried out within such partial field, meaning e.g. which proportion of the area of a partial field shall be exposed. On the basis of this information an adaptation of the heat amount to be introduced per unit area within a partial field may be carried out. In partial fields, in which an exposure will take place to a large extent, the heat amount to be introduced per unit area may thus be reduced and in partial fields, in which e.g. only a small area is exposed, the heat amount to be introduced per unit area may be increased.

Thus, referring to FIG. 6, for example in the partial field 507 the heat amount to be introduced per unit area is reduced and in the partial field 508 the heat amount to be introduced per unit area is increased. In the partial fields 502, 506 and 512 corresponding values for the heat amount to be introduced per unit area are selected. These values for the partial fields 502, 506 and 512 may for example be determined by interpolation taking into consideration the percentage of the area to be exposed in the respective partial field.

At the borders between partial fields having different values for the heat amount to be introduced per unit area, one can provide for a gradual transition of the heat amount to be introduced per unit area from one partial field to the other by inserting intermediate values near the border. The intermediate values for the heat amount to be introduced per unit area can also be determined by interpolation (e.g. linear interpolation or spline interpolation).

Preferably, in addition to or instead of taking into consideration the percentage of the area to be exposed within a partial field, the heat amount introduced within a partial field is taken into consideration in an even more accurate way. This may be effected in the following way:

If for example the heat amount for solidifying the building material is introduced in the material by sweeping a laser beam over layer regions to be exposed, the exposure parameters (e.g. the laser power, the beam deflection velocity, the length of a movement vector or the exposure type) will be defined by the control 10 before the start of the exposure of the layer, preferably based on equation (1) as described above.

Here, the term "beam deflection velocity" shall designate the velocity with which the point of incidence of the laser beam on the layer moves over the same due to the action of the deflection device 8.

The term "movement vector" shall designate a line segment along which the point of incidence moves linearly, before the direction is changed.

The term "exposure type" shall characterize a specific movement pattern with which the point of incidence is moved over the layer. For example, an object cross-section can be solidified by simply sweeping it with parallel exposure vectors next to each other. Alternatively, e.g. a stripe exposure may be selected: In a stripe exposure the object cross-section is divided into several stripes of width b and the exposure than is effected stripe by stripe, e.g. with parallel exposure vectors having a length b and extending in the direction of the width of one stripe. Apart from that, also other exposure types are possible.

For determining the heat energy introduced within a partial field, the heat energy amounts introduced by the individual exposure vectors in this partial field of the layer have to be summed up. For the resulting partial field energy input it accordingly results:

$$\text{partial field energy input} = \Sigma \text{laser power}/(\text{beam deflection velocity} \cdot \text{vector length}) \qquad (2)$$

Here, the sum is taken over the number of exposure vectors lying in the partial field (in case a vector extends across the border of the partial field this is taken into consideration by the vector length lying in the partial field). The partial field energy input determined in that way now can be reduced or increased by changing the laser power and/or the beam deflection velocity.

Further preferably, also the exposure type is taken into consideration when adjusting the heat amount to be introduced per unit area in a partial field: In case the exposure vectors extend e.g. over the total partial field, a point in the powder layer near to a singular exposure vector may have more time to cool down than e.g. in a case of short exposure vectors next to each other, where a point is heated at short intervals by the exposure vectors near it. Depending on the exposure type and the frequency of encounters of exposure vectors the heat amount to be introduced per unit area can be reduced or increased.

In a modification of the just described approach for the correction of the heat amount to be introduced per unit area not only the partial field energy input determined at first in the layer to be currently exposed is considered. In addition, also the partial field energy input in the same partial field in the underlying layer and/or in the overlying layer is considered. In an even further modification partial field energy inputs in the same partial field in several layers beneath the current layer and/or several layers above the current layer are considered.

In the described modifications of the approach it is taken into consideration that in view of the heat transportation via the boundaries between layers a volume consideration, meaning a consideration, how much heat energy is inputted in a partial volume, leads to still more accurate results. In the end the layer thickness has an influence here too:

The above relation (2) can be formulated as $$\text{partial volume energy input} = \Sigma \text{laser power}/(\text{beam deflection velocity} \cdot \text{vector length} \cdot \text{layer thickness}) \qquad (3)$$

(in case a partial volume of a layer is taken into consideration). If a partial volume extends over a number n of layers, in equation (3) the layer thickness has to be multiplied with the respective number n. In general, the influence of heat transport via boundaries between layers should be the larger the smaller the layer thickness.

The invention claimed is:

1. A method for layer-wise construction of at least one three-dimensional object from a building material in powder form by coalescing particles of the powder into solidified layers of the building material at positions of each of the layers in correspondence with a cross-section of the at least one object, wherein the coalescence is effected by introducing heat energy via electromagnetic or particle radiation, the method comprising:

a first powder application step of applying a first layer of the building material in powder form on a building support or on a previously provided layer of the building material in powder form;

a first pre-heating step of pre-heating the building material applied in the first powder application step up to a pre-heating temperature below a temperature at which the powder particles coalesce;

a first solidification step of effecting a coalescence of powder particles by irradiating first positions of the first applied layer by electromagnetic radiation or particle radiation to form a first solidified layer, the radiation acting on the first positions so that the powder particles at the first positions coalesce by sintering or melting due to heat energy introduced by the radiation and then form the first solidified layer, wherein the first positions correspond to a first cross-section of the at least one object;

a next powder application step of applying a subsequent layer of the building material in powder form on at least one prior layer that has previously been solidified at selected positions, wherein one of the at least one prior layers is the first solidified layer;

a next pre-heating step of pre-heating the building material applied in the next powder application step up to the pre-heating temperature below the temperature at which the powder particles coalesce;

a next solidification step of effecting a coalescence of powder particles by irradiating next positions of the next applied layer by electromagnetic radiation or particle radiation, the radiation acting on all the next positions of the subsequently applied layer so that the powder particles at the next positions coalesce by sintering or melting due to heat energy introduced by the radiation and then form a next solidified layer, wherein the next positions correspond to a next cross-section of the at least one object; and successively repeating the next powder application step, the next pre-heating step, and the next solidification step until all cross-sections of the at least one three-dimensional object are solidified in layer-wise fashion, each next solidified layer fusing with a solidified respective prior layer, wherein at least one of the next solidification steps further comprises adjusting the heat energy amount introduced per unit area by the electromagnetic radiation or particle radiation in at least one partial region of the respective subsequently applied layer of the respective next solidification step depending on a determined actual duration of a respective previous solidification step for irradiating all positions in the respective prior layer at which powder particles are coalesced in that prior layer.

2. The method according to claim 1, wherein the at least one partial region of the respective subsequently applied layer is selected such that a whole of the at least one partial region lies above a region in which the powder particles have coalesced in the prior layer of a previous solidification step.

3. The method according to claim 1, wherein the adjusted heat energy amount introduced per unit area into the at least one partial region of at least one of the next solidification steps depends on a factor K, wherein Ecorrected=K×Estandard, where Ecorrected is the adjusted heat energy amount per unit area actually introduced in the at least one partial region and Estandard is heat energy amount per unit area that would have been introduced without consideration of the determined actual duration, said factor K being the same for all positions at which powder particles are coalesced in the at least one partial region and depending on the determined actual duration of the previous solidification step for the respective prior layer.

4. The method according to claim 3, wherein the factor K is determined empirically by:

produce a plurality of test objects each having a uniform cross-section in a built-up direction thereof, wherein a duration of the irradiation for cross-sections of each of the test objects differs;

determining an object property for each of the test objects;

approximating a dependency of the determined object property on its respective duration of the irradiation by a function; and specifying the factor K based on the function and based on the determined actual duration of the respective previous solidification step for the prior layer of the respective previous solidification step.

5. The method according to claim 4, wherein the duration of the irradiation for each test object cross-section differs by including a waiting time without irradiation, a length of the waiting time varying for each of the test objects.

6. The method according to claim 4, wherein the object property determined for the test objects is a mechanical property, a dimension, or a parameter for describing surface quality.

7. The method according to claim 3, wherein the factor K is specified based on the determined actual duration for a most recent N prior powder layers, wherein N is an integer having a minimum value of two.

8. The method according to claim 3, wherein the factor K also depends on a duration calculated in advance of the current next solidification step for irradiating all positions in the respective layer at which powder particles are being coalesced.

9. The method according to claim 1, wherein the radiation is electromagnetic radiation and the first and next positions of each of the first and subsequently applied layers are exposed to the radiation areally or linearly.

10. The method according to claim 1, wherein in at least one of the next solidification steps, a beam offset is adjusted depending on the determined actual duration of the previous solidification step and/or depending on a duration calculated in advance of a respective next solidification step.

11. The method according to claim 1, wherein in each of the first and next solidification steps the first and next positions are irradiated using laser radiation and the heat energy amount introduced per unit area in the next solidification steps is adjusted by variation of laser light intensity, by variation of a deflection velocity of the laser beam, or by variation of a distance between laser beam tracks.

12. The method according to claim 1, wherein said adjusting additionally depends on a duration calculated in advance of the current next solidification step for irradiating all positions in the respective layer at which powder particles are being coalesced.

* * * * *